(12) United States Patent
Chen et al.

(10) Patent No.: US 11,038,574 B2
(45) Date of Patent: Jun. 15, 2021

(54) METHOD FOR CONTROLLING FEEDBACK OF CHANNEL STATE INFORMATION, AND DEVICE FOR FEEDING BACK CHANNEL STATE INFORMATION

(71) Applicant: China Academy of Telecommunications Technology, Beijing (CN)

(72) Inventors: Runhua Chen, Beijing (CN); Qiubin Gao, Beijing (CN); Tamrakar Rakesh, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/579,122

(22) PCT Filed: May 23, 2016

(86) PCT No.: PCT/CN2016/082989
§ 371 (c)(1),
(2) Date: Dec. 1, 2017

(87) PCT Pub. No.: WO2016/192544
PCT Pub. Date: Dec. 8, 2016

(65) Prior Publication Data
US 2018/0167124 A1    Jun. 14, 2018

(30) Foreign Application Priority Data
Jun. 4, 2015    (CN) .......................... 201510301165.7

(51) Int. Cl.
*H04B 7/06* (2006.01)
*H04W 88/02* (2009.01)
(Continued)

(52) U.S. Cl.
CPC ......... *H04B 7/0626* (2013.01); *H04B 7/0632* (2013.01); *H04B 7/0639* (2013.01);
(Continued)

(58) Field of Classification Search
CPC .. H04B 7/0626; H04B 7/0632; H04B 7/0639; H04W 88/02; H04W 72/0413; H04W 24/10
See application file for complete search history.

(56) References Cited

U.S. PATENT DOCUMENTS 9,344,164 B2 * 5/2016 Jing ..................... H04B 7/0469
9,912,392 B2 * 3/2018 Kim ..................... H04B 7/0456
(Continued)

FOREIGN PATENT DOCUMENTS

CN    102468933 A    5/2012
CN    102845097 A    12/2012
(Continued)

OTHER PUBLICATIONS

Alcatel-Lucent Shanghai Bell, Alcatel-Lucent,Considerations on CSI f eedback enhancements for high-priority antenna configurations,3GPP TSGRAN WG1 #66 R1-112420, Aug. 26, 2011, pp. 1-7.
(Continued)

*Primary Examiner* — Tejis Daya
(74) *Attorney, Agent, or Firm* — Foley & Lardner LLP (57) ABSTRACT

Disclosed are a channel state information feedback and a control method and device therefor, which are used for realizing large-scale CSI feedback under an antenna system, wherein a UE may only need to feedback some pieces of PMI information, so that the complexity of the UE feeding back CSI is reduced, and the flexibility for a network side to control the UE to feed back the CSI is better. The channel state information (CSI) feedback control method provided in
(Continued)

A base station determines that a UE needs to be controlled to feed back CSI, where the CSI at least includes a first PMI and a second PMI, both of which correspond to the same pre-coding matrix ⟶ S101

The base station transmits trigger signaling to the UE to trigger feedback of the CSI, where the trigger signaling includes indication information instructing the UE whether to feed back the first PMI and/or the second PMI ⟶ S102 the present application comprises: a base station determining that there is a need to control a user equipment (UE) to feed back CSI, the CSI at least comprising a first precoding matrix indicator (PMI) and a second PMI, the first PMI and the second PMI corresponding to the same precoding matrix; and the base station sending trigger signaling of CSI feedback to the UE, wherein indication information used for instructing whether the UE feeds back the first PMI and/or the second PMI is comprised.

16 Claims, 3 Drawing Sheets

(51) Int. Cl.
H04W 24/10 (2009.01)
H04W 72/04 (2009.01)

(52) U.S. Cl.
CPC .......... *H04W 88/02* (2013.01); *H04W 24/10* (2013.01); *H04W 72/0413* (2013.01)

(56) References Cited

U.S. PATENT DOCUMENTS

| | | | |
|---|---|---|---|
| 2008/0232492 A1* | 9/2008 | Xiao | H04B 7/0417 375/260 |
| 2009/0046569 A1* | 2/2009 | Chen | H04L 1/0029 370/203 |
| 2009/0247214 A1* | 10/2009 | Cai | H04W 52/0216 455/550.1 |
| 2010/0002598 A1* | 1/2010 | Pan | H04B 7/063 370/252 |
| 2010/0118989 A1* | 5/2010 | Sayana | H04L 5/0035 375/260 |
| 2010/0157924 A1* | 6/2010 | Prasad | H04W 52/346 370/329 |
| 2011/0261713 A1* | 10/2011 | Kishiyama | H04W 72/1226 370/252 |
| 2012/0064927 A1* | 3/2012 | Kim | H04J 11/0053 455/501 |
| 2012/0087424 A1* | 4/2012 | Brown | H04L 1/06 375/260 |
| 2012/0270535 A1 | 10/2012 | Chen et al. | |
| 2012/0314590 A1 | 12/2012 | Choudhury et al. | |
| 2013/0195035 A1* | 8/2013 | Taoka | H04B 7/0478 370/329 |
| 2013/0343299 A1* | 12/2013 | Sayana | H04B 7/0417 370/329 |
| 2014/0079100 A1* | 3/2014 | Kim | H04B 7/0417 375/219 |
| 2014/0079149 A1* | 3/2014 | Lee | H04B 7/0417 375/267 |
| 2014/0254517 A1* | 9/2014 | Nam | H04B 7/0417 370/329 |
| 2014/0328422 A1* | 11/2014 | Chen | H04B 7/0486 375/267 |
| 2014/0334409 A1* | 11/2014 | Kim | H04B 7/063 370/329 |
| 2014/0369279 A1 | 12/2014 | Yu et al. | |
| 2015/0146658 A1* | 5/2015 | Liu | H04L 5/0053 370/329 |
| 2016/0359538 A1* | 12/2016 | Onggosanusi | H04L 5/0057 |
| 2017/0237463 A1* | 8/2017 | Zheng | H04W 56/00 370/328 |
| 2017/0250743 A1* | 8/2017 | Jongren | H04B 7/0617 |
| 2018/0138954 A1* | 5/2018 | Gao | H04B 7/06 |

FOREIGN PATENT DOCUMENTS

| | | |
|---|---|---|
| CN | 102859894 A | 1/2013 |
| CN | 104009828 | 8/2014 |
| CN | 104243003 | 12/2014 |
| JP | 2014-504126 A | 2/2014 |
| JP | 2014-096807 A | 5/2014 |
| WO | WO-2014/137043 A1 | 9/2014 |

OTHER PUBLICATIONS

ITRI,Feedback Enhancement for 2D Antenna Array,3GPP TSG RAN WG1 Mee ting #80 R1-150423,Feb. 13, 2015.

LG Electronics, "Discussion on hybrid beamformed and non-precoded CSI-RS based scemes," 3GPP TSG-RAN WG1 Meeting #80bis, R1-151535, Belgrade, Serbia, Apr. 20-24, 2015.

* cited by examiner

METHOD FOR CONTROLLING FEEDBACK OF CHANNEL STATE INFORMATION, AND DEVICE FOR FEEDING BACK CHANNEL STATE INFORMATION

This application is a US National Stage of International Application No. PCT/CN2016/082989, filed on May 23, 2016, designating the United States and claiming priority to Chinese Patent Application No. 201510301165.7, filed with the Chinese Patent Office on Jun. 4, 2015 and entitled "CHANNEL STATE INFORMATION FEEDBACK AND CONTROL METHOD AND DEVICE THEREFOR", the content of which is hereby incorporated by reference in its entirety.

FIELD

The present disclosure relates to the field of communications, and particularly to a method and a device for feeding back channel state information, and a method and a device for controlling feedback of channel state information.

BACKGROUND

Three-dimension beam-forming or pre-coding in a Frequency Division Duplex (FDD) system needs to be performed relying upon Channel State Information (CSI) reported by a User Equipment (UE). Channel feedback of 2, 4, and 8 antenna ports is defined in the existing Long Term Evolution (LTE) system and a channel feedback is made using a codebook. The network and the UE firstly define a common codebook including a set of possible pre-coding matrixes, which are also called codewords, there each codeword is a pre-coding matrix which can be fed back by the UE. The UE selects the optimum codeword from the codebook, and then feeds back an index thereof, which is referred to as a Pre-coding Matrix Indicator (PMI). The UE also feeds back a Rank Indicator (RI) corresponding to the PMI, which is equivalent to the number of code streams that can be supported, and a Channel Quality Indicator (CQI) related to the RI/PMI, together with the PMI. The size of the pre-coding matrix corresponding to the fed back PMI is Nt×RI, where Nt represents the number of antennas of a base station (e.g., 2, 4, or 8).

The CSI can be fed back periodically or aperiodically. If the CSI is fed back aperiodically, then the eNB schedules the UE to report the CSI to be fed back via dynamic signaling. In the LTE system, the CSI is fed back aperiodically using an uplink grant. When the eNB schedules a Physical Uplink Shared Channel (PUSCH) to transmit uplink data, the eNB transmits Downlink Control Information (DCI) to indicate an uplink grant, and to notify the UE of parameters for uplink transmission, e.g., a transmission bandwidth, a transmission frequency resource (e.g., a Physical Resource Block (PRB)), transmit power, etc. A part of control signaling in the DCI can be used to notify the UE of whether to feed back the CSI while transmitting the PUSCH uplink data. One bit in the DCI of the existing system is used to trigger the UE to feed back the CSI or not, where if the bit is 0, then the UE does not feed back the CSI, and if the bit is 1, then the UE feeds back the CSI (including the RI, the PMI, and the CQI) together with the PUSCH data. The UE in the existing system may also feed back only the CSI without transmitting any uplink data, where the UE feeds back the CSI in the PUSCH transmission, but there is no uplink data in the PUSCH. Here the PMI is a pre-coding matrix indicator representing a codeword in a codebook, and may be corresponding to 2, 4, or 8 antennas.

A large-scale antenna system is being investigated in a new generation of antenna system, which is also referred to as a 3D-Multiple Input Multiple Output (3D-MIMO) system. The 3D-MIMO system is characterized in a large number of antennas at the base station side and in that these antennas might have two-dimension antenna structure, e.g., antennas of 16, 32, 64, etc., which is referred to as a large-scale antenna system.

However there has been absent in the prior art a solution to feeding back CSI in a large-scale antenna system.

SUMMARY

Embodiments of the disclosure provide a method and a device for feeding back channel state information, and a method and a device for controlling feedback of channel state information so that CSI can be fed back in a large-scale antenna system, and a UE may feed back only a part of PMI information, thus lowering complexity of feeding back the CSI by the UE, and improving flexibility at the network side in controlling the UE to feed back the CSI.

An embodiment of the disclosure provides a method for controlling feedback of CSI, the method including: determining, by a base station, that a UE needs to be controlled to feed back CSI, where the CSI at least includes a first PMI and a second PMI, the first PMI and the second PMI correspond to the same pre-coding matrix; and transmitting, by the base station, trigger signaling to the UE to trigger feedback of the CSI, where the trigger signaling includes indication information for instructing the UE whether to feed back the first PMI and/or the second PMI.

With this method, the base station determines that the UE needs to be controlled to feed back CSI at least including the first PMI and the second PMI, both of which correspond to the same pre-coding matrix; and the base station transmits the trigger signaling to the UE to trigger feedback of the CSI, where the trigger signaling includes the indication information for instructing the UE whether to feed back the first PMI and/or the second PMI, so that the CSI can be fed back in a large-scale antenna system, and the UE may feed back only a part of the PMI information in the large-scale antenna system, thus lowering the complexity of feeding to back the CSI, and improving the flexibility at the network side in controlling the UE to feed back the CSI.

Optionally the trigger signaling includes indication information for instructing the UE to feed back both the first PMI and the second PMI. Or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI. Or the trigger signaling includes indication information for instructing the UE not to feed back the second PMI but to feed back the first PMI, and indication information for determining the second PMI.

Optionally when the trigger signaling does not include indication information for instructing the UE to feed back the second PMI, the method further includes: notifying semi-statically, by the base station, the UE of indication information for determining the second PMI, via higher-layer signaling. Or when the trigger signaling does not include indication information for instructing the UE to feed back the first PMI, the method further includes: notifying semi-statically, by the base station, the UE of indication information for determining the first PMI, via higher-layer signaling.

Optionally when the trigger signaling does not include indication information for instructing the UE to feed back the second PMI, the UE determines the second PMI using a second PMI fed back most recently. Or when the trigger signaling does not include indication information for instructing the UE to feed back the first PMI, the UE determines the first PMI using a first PMI fed back most recently.

Optionally when the trigger signaling does not include indication information for instructing the UE to feed back the second PMI, the trigger signaling further includes indication information for instructing the UE to determine the second PMI using indication information for determining the second PMI, notified semi-statically via higher-layer signaling, or using a second PMI fed back most recently. Or when the trigger signaling does not include indication information for instructing the UE to feed back the first PMI, the trigger signaling further includes indication information for instructing the UE to determine the first PMI using a first PMI notified semi-statically via higher-layer signaling, or using a first PMI fed back most recently.

An embodiment of the disclosure provides a method for feeding back CSI, the method including: receiving, by a UE, trigger signaling transmitted by a base station to trigger feedback of the CSI, where the trigger signaling includes indication information for instructing the UE whether to feed back a first PMI and/or a second PMI by the UE, the CSI according to the trigger signaling.

With this method, the UE receives the trigger signaling transmitted by the base station to trigger feedback of the CSI, where the trigger signaling includes the indication information for instructing the UE whether to feed back a first PMI and/or a second PMI; and the UE feeds back the CSI according to the trigger signaling, so that the CSI can be fed back in a large-scale antenna system. And when the trigger signaling transmitted by the base station to trigger the feedback of the CSI includes the indication information indicating whether the UE needs to feed back the first PMI or the second PMI, the UE only needs to feed back CSI of antennas in only a part of the dimensions, thus lowering the complexity of feeding back the CSI, and improving the flexibility at the network side in controlling the UE to feed back the CSI.

Optionally the trigger signaling includes indication information for instructing the UE to feed back both the first PMI and the second PMI; or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally when an array of antennas comprises M antennas in a vertical dimension and N antennas in a horizontal dimension, a first codebook including M codewords and a second codebook including N codewords are preset; and the triggering signaling includes indication information for instructing the UE to feed back the first PMI of the antennas in the vertical dimension, or indication information for instructing the UE to feed back the second PMI of the antennas in the horizontal dimension, where the first PMI corresponds to a codeword in the first codebook, and the second PMI corresponds to a codeword in the second codebook.

Optionally the trigger signaling includes indication information for instructing the UE not to feed back the first PMI but to feed back the second PMI, and indication information for determining the first PMI; and feeding back, by the UE, the CSI according to the trigger signaling includes: determining, by the UE, the first PMI according to the indication information for determining the first PMI; determining the second PMI according to the first PMI; and feeding the second PMI back to the base station. Or the trigger signaling includes indication information for instructing the UE not to feed back the second PMI but to feed back the first PMI, and indication information for determining the second PMI; and feeding back, by the UE, the CSI according to the trigger signaling includes: determining, by the UE, the second PMI according to the indication information for determining the second PMI; determining the first PMI according to the second PMI; and feeding the first PMI back to the base station.

Optionally when the trigger signaling does not include indication information for instructing the UE to feed back the second PMI, feeding back, by the UE, the CSI according to the trigger signaling includes: determining, by the UE, the first PMI according to a preset second PMI, or according to indication information for determining the second PMI, notified semi-statically by the base station to the UE via higher-layer signaling, or according to a second PMI reported most recently; and feeding the first PMI back to the base station. Or when the trigger signaling does not include indication information for instructing the UE to feed back the first PMI, feeding back, by the UE, the CSI according to the trigger signaling includes: determining, by the UE, the second PMI according to a preset first PMI, or according to indication information for determining the first PMI, notified semi-statically by the base station to the UE via higher-layer signaling, or according to a first PMI reported most recently, and feeding the second PMI back to the base station.

An embodiment of the disclosure provides a device for controlling feedback of CSI, the device including: a first unit configured to determine that a UE needs to be controlled to feed back CSI at least including a first PMI and a second PMI, both of which correspond to the same pre-coding matrix; and a second unit configured to transmit trigger signaling to the UE to trigger feedback of the CSI, where the trigger signaling includes indication information for instructing the UE whether to feed back the first PMI and/or the second PMI.

Optionally the trigger signaling includes indication information for instructing the UE to feed back both the first PMI and the second PMI; Or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI. Or, the trigger signaling includes indication information for instructing the UE not to feed back the second PMI but to feed back the first PMI, and indication information for determining the second PMI.

Optionally when the trigger signaling does not include indication information for instructing the UE to feed back the second PMI, the second unit is further configured to notify semi-statically the UE of indication information for determining the second PMI, via higher-layer signaling. Or, when the trigger signaling does not include indication information for instructing the UE to feed back the first PMI, the second unit is further configured to notify semi-statically the UE of indication information for determining the first PMI, via higher-layer signaling.

Optionally when the trigger signaling does not include indication information for instructing the UE to feed back the second PMI, the UE determines the second PMI using a second PMI fed back most recently. Or, when the trigger signaling does not include indication information for instructing the UE to feed back the first PMI, the UE determines the first PMI using a first PMI fed back most recently.

Optionally when the trigger signaling does not include indication information for instructing the UE to feed back the second PMI, the trigger signaling further includes indication information for instructing the UE to determine the second PMI using indication information for determining the second PMI, notified semi-statically via higher-layer signaling, or using a second PMI fed back most recently; or when the trigger signaling does not include indication information for instructing the UE to feed back the first PMI, the trigger signaling further includes indication information for instructing the UE to determine the first PMI using a first PMI notified semi-statically via higher-layer signaling, or using a first PMI fed back most recently.

An embodiment of the disclosure provides a device for feeding back CSI, the device including: a receiving unit configured to receive trigger signaling transmitted by a base station to trigger feedback of the CSI, where the trigger signaling includes indication information for instructing the UE whether to feed back a first PMI and/or a second PMI; and a feedback unit configured to feed back the CSI according to the trigger signaling.

Optionally the trigger signaling includes indication information for instructing the UE to feed back both the first PMI and the second PMI; or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI; and the feedback unit is configured to: determine the first PMI according to the indication information for determining the first PMI; determine the second PMI according to the first PMI; and feed the second PMI back to the base station. Or, the trigger signaling includes indication information for instructing the UE not to feed back the second PMI but to feed back the first PMI, and indication information for determining the second PMI; and the feedback unit is configured to: determine the second PMI according to the indication information for determining the second PMI; determine the first PMI according to the second PMI; and feed the first PMI back to the base station.

Optionally when the trigger signaling does not include indication information for instructing the UE to feed back the second PMI, the feedback unit is configured to: determine the first PMI according to a preset second PMI, or according to indication information for determining the second PMI, notified semi-statically by the base station to the UE via higher-layer signaling, or according to a second PMI reported most recently; and feed the first PMI back to the base station. Or when the trigger signaling does not include indication information for instructing the UE to feed back the first PMI, the feedback unit is configured to: determine the second PMI according to a preset first PMI, or according to indication information for determining the first PMI, notified semi-statically by the base station to the UE via higher-layer signaling, or according to a first PMI reported most recently; and feed the second PMI back to the base station.

An embodiment of the disclosure provides another device at the network side for controlling feedback of CSI, the device including a processor configured to read a program in a memory so as to: determine that a UE needs to be controlled to feed back CSI at least including a first PMI and a second PMI, where the first PMI and the second PMI correspond to the same pre-coding matrix; and control a transmitter to transmit trigger signaling to the UE to trigger feedback of the CSI, where the trigger signaling includes indication information for instructing the UE whether to feed back the first PMI and/or the second PMI.

Optionally the trigger signaling includes indication information for instructing the UE to feed back both the first PMI and the second PMI. Or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI; or the trigger signaling includes indication information for instructing the UE not to feed back the second PMI but to feed back the first PMI, and indication information for determining the second PMI.

Optionally when the trigger signaling does not include indication information for instructing the UE to feed back the second PMI, the processor is configured to: control the transmitter to notify semi-statically the UE of indication information for determining the second PMI, via higher-layer signaling. Or when the trigger signaling does not include indication information for instructing the UE to feed back the first PMI, then the processor is configured to:

control the transmitter to notify semi-statically the UE of indication information for determining the first PMI, via higher-layer signaling.

Optionally when the trigger signaling does not include indication information for instructing the UE to feed back the second PMI, the UE determines the second PMI using a second PMI fed back most recently. Or when the trigger signaling does not include indication information for instructing the UE to feed back the first PMI, the UE determines the first PMI using a first PMI fed back most recently.

Optionally when the trigger signaling does not include indication information for instructing the UE to feed back the second PMI, the trigger signaling further includes indication information for instructing the UE to determine the second PMI using indication information for determining the second PMI, notified semi-statically via higher-layer signaling, or using a second PMI fed back most recently. Or when the trigger signaling does not include indication information for instructing the UE to feed back the first PMI, the trigger signaling further includes indication information for instructing the UE to determine the first PMI using a first PMI notified semi-statically via higher-layer signaling, or using a first PMI fed back most recently.

Correspondingly an embodiment of the disclosure provides another device at the UE side for feeding back CSI, the device including a processor configured to read a program in a memory so as to: control the transceiver to receive trigger signaling transmitted by a base station to trigger feedback of the CSI, where the trigger signaling includes indication information for instructing the UE whether to feed back a first PMI and/or a second PMI; and feed back the CSI according to the trigger signaling.

Optionally the trigger signaling includes indication information for instructing the UE to feed back both the first PMI and the second PMI; or the trigger signaling includes indication information for instructing the UE not to feed back the first PMI or the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI, and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI; and the processor is configured to: determine the first PMI according to the indication information for determining the first PMI; determine the second PMI according to the first PMI; and control the transceiver to feed the second PMI back to the base station. Or the trigger signaling includes indication information for instructing the UE not to feed back the to second PMI but to feed back the first PMI, and indication information for determining the second PMI; and the processor is configured to: determine the second PMI according to the indication information for determining the second PMI; determine the first PMI according to the second PMI; and control the transceiver to feed the first PMI back to the base station.

Optionally when the trigger signaling does not include indication information for instructing the UE to feed back the second PMI, the processor is configured to: determine the first PMI according to a preset second PMI, or according to indication information for determining the second PMI, notified semi-statically by the base station to the UE via higher-layer signaling, or according to a second PMI reported most recently; and control the transceiver to feed the first PMI back to the base station. Or when the trigger signaling does not include indication information for instructing the UE to feed back the first PMI, the processor is configured to: determine the second PMI according to a preset first PMI, or according to indication information for determining the first PMI, notified semi-statically by the base station to the UE via higher-layer signaling, or according to a first PMI reported most recently; and control the transceiver to feed the second PMI back to the base station.

DETAILED DESCRIPTION OF THE EMBODIMENTS

Embodiments of the disclosure provide a method and a device for feeding back channel state information, and a method and a device for controlling feedback of channel state information so as to feed back CSI in a large-scale antenna system, thus lowering the complexity of feeding back the CSI by a UE, and improving the flexibility at the network side in controlling the UE to feed back the CSI.

An array of active antennas including separately controllable array elements has emerged in the industry along with the development of antenna technologies. With this design, the array of antennas may evolve from the existing horizontal arrangement in a two-dimension plane to a horizontal-vertical arrangement in a three-dimension space. This pattern of the array of antennas makes it possible to adjust a beam dynamically in both the horizontal and vertical directions at the same time, instead of limiting to dynamic adjustment of a beam in the horizontal direction as in a traditional antenna system.

Beam-forming or pre-coding in a large-scale antenna system needs to relies upon channel state information reported by a UE. Generally feedback codeword in the large-scale antenna system may correspond to two PMIs which correspond respectively to codewords in two lower-dimension codebooks. For example, there are 32 antennas in total in a base station, which include 4 antennas in the vertical dimension by 8 antennas in the horizontal dimension. Two lower-dimension codebooks are defined in the system, where the first codebook is a 4Tx codebook corresponding to the vertical dimension, and the second codebook is 8Tx codebook corresponding to the horizontal dimension. In order to feed back a 32Tx precoder, the UE feeds back a first PMI and a second PMI, where the first PMI corresponds to a 4Tx precoder W1 in the first codebook, and the second PMI corresponds to a 8Tx precoder W2 in the second codebook, and the overall 32Tx precoder W can be written as:

$$W = W1 \otimes W2 \qquad \text{Equation 1}$$

The correspondence relationship between the overall 32Tx codebook W, and W and W2 as represented in Equation 1 is only an example, and there may be another correspondence relationship between them, although a repeated description thereof is omitted here.

However if an eNB triggers the CSI to be fed back using the one-bit triggering method, the UE triggered to feed back the CSI needs to feed back both the first PMI and the second PMI, which may result in the following two drawbacks.

Firstly there is high complexity at the UE's side. For example, there are 16 precoders in the first codebook, and 128 precoders in the second codebook. If each time when the UE feeding back W it must feed back the first PMI and the second PMI, then the UE needs to select optimum first PMI and second PMI from 2018 (16*128) combinations of the first PMI and the second PMI, thus resulting in high complexity at the UE's side.

Secondly there is low flexibility of the eNB in scheduling. The eNB has no way to control what is to be fed back by the UE. If the eNB needs no new feedback of the first PMI, but only needs feedback of the second PMI, it has no way to trigger this using the one-bit triggering method, because both the first PMI and the second PMI are always triggered to be fed back using the one-bit triggering method. Such a situation happens in a real system when the eNB needs only one PMI, but not the other PMI to be fed back. For example, a PMI1 corresponds to beam-forming information in the vertical dimension, and since the position of the UE in the vertical dimension varies very slowly or even substantially does not vary, the PMI1 also varies very slowly, the eNB does not require the UE to feed back information about the PMI1 frequently, and once the PMI1 is fed back, the eNB might only require the UE to feed back the information about a PMI2 within a very long period of time to reflect a channel in the horizontal direction. In another example, state information in the vertical dimension corresponding to the PMI1 can be measured by the eNB in the uplink instead of being fed back by the UE to the eNB, and the eNB only requires the UE to feed back the information about the PMI2. Accordingly such a mechanism needs to be supported for feedback in the large-scale antenna system that the eNB only triggers a part of the PMIs to be fed back without triggering the other part of the PMIs to be fed back.

It shall be noted that in the embodiments of the disclosure, a CQI may also be fed back together with at least one of the first PMI and the second PMI.

The embodiments of the disclosure takes into account the high complexity at the UE's side. For example, there are 16 precoders in the first codebook, and 128 precoders in the second codebook, and if each time when the UE feeds back W it must always feed back the first PMI and the second PMI, the UE needs to select the optimum first PMI and second PMI from 2018 (16*128) combinations of the first PMI and the second PMI, thus resulting in high complexity at the UE's side, Whereas if the UE only feeds back the second PMI, the UE only needs to select one out of 128 codewords. Similarly if the UE only needs to feed back the first PMI, the UE only needs to select one out of 16 codewords. Accordingly in order to lower the complexity at the UE's side, and to improve the flexibility of the base station, the network side may instruct the UE to feed back CSI of only a part of antennas, or even instruct the UE not to feed back any CSI, or instruct the UE to feed back all the CSI, according to embodiments of the disclosure.

Figure 1:
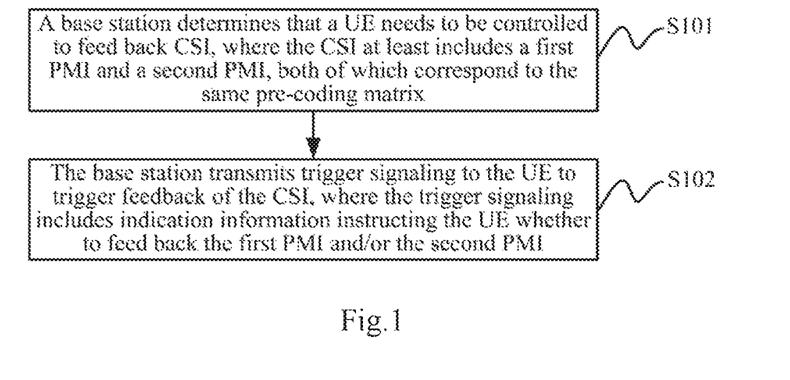
FIG. 1 is a schematic flow chart of a method for controlling feedback of channel state information according to an embodiment of the disclosure.

Referring to FIG. 1, a method for controlling feedback of CSI according to an embodiment of the disclosure at the network side includes the following operations.

In the operation S101, a base station determines that a UE needs to be controlled to feed back CSI. The CSI at least includes a first PMI and a second PMI, both of which correspond to the same pre-coding matrix.

The technical solution according to the embodiment of the disclosure can be applied to a scenario of a large-scale antenna system, where beam-forming matrix information in a channel is determined by both the first PMI and the second PMI fed back by the UE. For example, the first PMI corresponds to a codebook in a horizontal dimension, and the second PMI corresponds to a codebook in a vertical dimension, where the Kronecker product of beam-forming matrixes corresponding to the two PMIs reflects overall beam-forming matrix information of the large-scale antenna system (this is only one possibility, and there may be other possible correspondence relationships between the beam-forming matrix, and the first PMI or the second PMI).

In the operation S102, the base station transmits trigger signaling to the UE to trigger feedback of the CSI, where the trigger signaling includes indication information for instructing the UE whether to feed back the first PMI and/or the second PMI.

With this method, CSI can be fed back in the large-scale antenna system, and when the base station transmits the trigger signaling to the UE to trigger feedback of the CSI, where the trigger signaling includes the indication information for instructing the UE whether to feed back the first PMI and/or the second PMI, the UE may only feed back a part of the CSI, e.g., CSI information corresponding to a part of dimensions of the array of antennas. With this method, the base station transmits the trigger signaling to the UE to trigger feedback of the CSI, when determining that the UE needs to be controlled to feed back CSI, where the trigger signaling includes indication information for instructing the UE to feed back a part of the CSI, so that the UE only needs to calculate and feed back the part of the CSI (e.g., CSI corresponding to antennas in a part of the dimensions) instead of all the CSI in the large-scale antenna system, thus lowering the complexity of feeding back the CSI, and improving the flexibility at the network side in controlling the UE to feed back the CSI.

The embodiment of the disclosure still supposes that a 3D-MIMO codeword corresponds to two PMIs, i.e., the first PMI and the second PMI, therefore the following four triggered states are supported in the embodiment of the disclosure.

In a first state, the UE is triggered to report the first PMI and the second PMI.

In a second state, the UE is triggered to report only the first PMI.

In a third state, the UE is triggered to report only the second PMI.

In a fourth state, the UE is not triggered to report any PMI.

For example, the system may notify the UE of an assumed first PMI, and the UE calculates and feeds back the second PMI and a CQI according to the assumed first PMI. The first PMI notified of by the system may correspond to a first PMI in the vertical dimension, may be obtained according to channel reciprocity, or may be obtained according to a first PMI fed back previously. In this way, if the system notifies the UE of the first PMI, the UE may calculate the second PMI by using the Equation 1. Because the UE only needs to search in a codebook of the second PMI, the complexity is significantly reduced.

Here triggering the UE to report the first PMI and the second PMI can be done by encoding different bits in the signaling separately or by encoding the same bit in the signaling. It is assumed below that there are M codewords in the first codebook, and N codewords in the second codebook, where the first PMI corresponds to a codeword in the first codebook, and the second PMI corresponds to a codeword in the second codebook.

Optionally, when the array of antennas includes Nt1 antennas in the vertical dimension and Nt2 antennas in the horizontal dimension, a first codebook including M codewords and a second codebook including N codewords are preset, that is, the first codebook including M codewords and the second codebook including N codewords are prescribed at the base station side and the UE side. Optionally the first codebook may correspond to beam-forming matrix information in the vertical dimension, and the second codebook may correspond to beam-forming matrix information in the horizontal dimension.

The triggering signaling includes indication information for instructing the UE to feed back the first PMI (e.g., corresponding to antennas in the vertical dimension), and/or indication information for instructing the UE to feed back the second PMI (e.g., corresponding to antennas in the horizontal dimension), where the first PMI corresponds to a codeword in the first codebook, and the second PMI corresponds to a codeword in the second codebook.

For example, the trigger signaling includes indication information for instructing the UE to feed back both the first PMI and the second PMI; or the trigger signaling includes indication information for instructing the UE not to feed back the first PMI or the second PMI.

Alternatively, for example, the indication information for instructing the UE to feed back the first PMI and the indication information for instructing the UE to feed back the second PMI, in the trigger signaling, is encoded in the same bit.

Or the indication information for instructing the UE to feed back the first PMI and the indication information for instructing the UE to feed back the second PMI, in the trigger signaling, is encoded in different bits.

Alternatively, for example, the network side can notify the UE of one part of the PMIs, and instruct the UE to feed back the other part of the PMIs, that is, the trigger signaling specifically includes indication information for instructing the UE not to feed back the first PMI but to feed back the second PMI, and indication information for determining the first PMI; or the trigger signaling specifically includes indication information for instructing the UE not to feed back the second PMI but to feed back the first PMI, and indication information for determining the second PMI.

The network side can alternatively notify the UE of a part of the PMIs by notifying semi-statically the UE via higher-layer signaling, so when the trigger signaling does not include the indication information for instructing the UE to feed back the second PMI, the method further includes: notifying semi-statically, by the base station, the UE of indication information for determining the second PMI, via higher-layer signaling.

Or when the trigger signaling does not include the indication information for instructing the UE to feed back the first PMI, the method further includes: notifying semi-statically, by the base station, the UE of indication information for determining the first PMI, via higher-layer signaling.

Optionally when the trigger signaling does not include the indication information for instructing the UE to feed back the second PMI, the UE determines the second PMI according to a second PMI fed back most recently.

Or when the trigger signaling does not include the indication information for instructing the UE to feed back the first PMI, the UE determines the first PMI according to a first PMI fed back most recently.

Optionally when the trigger signaling does not include the indication information for instructing the UE to feed back the second PMI, the trigger signaling further includes indication information for instructing the UE to determine the second PMI according to the indication information for determining the second PMI, notified semi-statically via higher-layer signaling, or according to the second PMI fed back most recently.

Or when the trigger signaling does not include the indication information for instructing the UE to feed back the first PMI, the trigger signaling further includes indication information for instructing the UE to determine the first PMI according to the indication information for determining the first PMI, notified semi-statically via higher-layer signaling, or according to the first PMI fed back most recently.

For example, the eNB can measure beam-forming information in the vertical dimension (equivalent to the first PMI) for an uplink channel according to the reciprocity between uplink and downlink channels, then notify the UE of the first PMI via higher-layer signaling, and the UE measures and reports the second PMI using the first PMI as an assumption. In another implementation, the eNB triggers the UE to measure the first PMI by itself, and to calculate the second PMI to be reported according to the first PMI. In some scenarios, the eNB may need to switch dynamically between the two implementations. For example, if the speed of the UE varies significantly, the speed of the UE may be high or low. If the speed of the UE is low, the precision of the first PMI measured by the eNB may be acceptable, and the eNB allows the UE to use the first PMI notified of via higher-layer signaling. If the speed of the UE is high at some point of time, the eNB anticipates low precision of the first PMI measured by the eNB, and may instruct the UE to report both the first PMI and the second PMI derived by the UE based on it downlink measurement.

Figure 2:
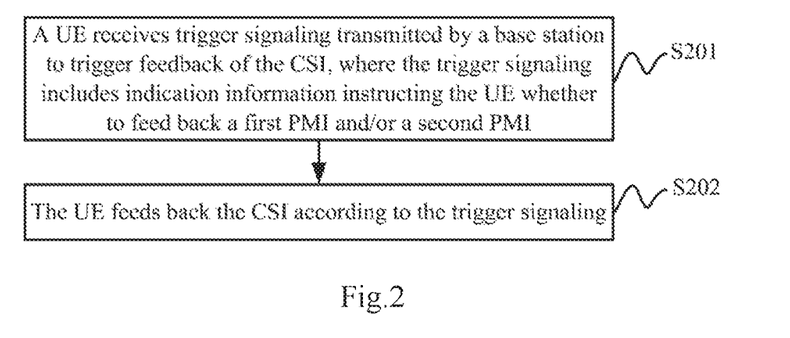
FIG. 2 is a schematic flow chart of a method for feeding back channel state information according to an embodiment of the disclosure.

Correspondingly referring to FIG. 2, a method for feeding back CSI at the UE side according to an embodiment of the disclosure includes the following operations.

In the operation S201, a UE receives trigger signaling transmitted by a base station to trigger feedback of the CSI, where the trigger signaling includes indication information for instructing the UE whether to feed back a first PMI and/or a second PMI, e.g., indication information for instructing the UE to feed back CSI of antennas in a part of dimensions in an array of antennas.

In the operation S202, the UE feeds back the CSI according to the trigger signaling.

With this method, the UE receives the trigger signaling transmitted by the base station to trigger feedback of the CSI, where the trigger signaling includes the indication information for instructing the UE whether to feed back the first PMI and/or the second PMI (e.g., the CSI of the antennas in the part of the dimensions in the array of antennas); and the UE feeds back the CSI according to the trigger signaling, so that the UE only needs to feed back a part of the CSI (e.g., the CSI of the antennas in the part of the dimensions in the array of antennas), thus lowering the complexity of feeding back the CSI, and improving the flexibility at the network side in controlling the UE to feed back the CSI.

Optionally when the array of antennas includes Nt1 antennas in a vertical dimension and Nt2 antennas in a horizontal dimension, a first codebook including M codewords and a second codebook including N codewords are preset.

The triggering signaling includes indication information for instructing the UE to feed back the first PMI (e.g., corresponding to antennas in the vertical dimension), and/or indication information for instructing the UE to feed back the second PMI (e.g., corresponding to antennas in the horizontal dimension), where the first PMI corresponds to a codeword in the first codebook, and the second PMI corresponds to a codeword in the second codebook.

Optionally the trigger signaling includes indication information for instructing the UE to feed back both the first PMI and the second PMI; or the trigger signaling includes indication information for instructing the UE not to feed back the first PMI or the second PMI.

Optionally the indication information for instructing the UE to feed back the first PMI and the indication information for instructing the UE to feed back the second PMI, in the trigger signaling, is encoded in the same bit.

Or the indication information for instructing the UE to feed back the first PMI and the indication information for instructing the UE to feed back the second PMI, in the trigger signaling, is encoded in different bits.

Optionally the trigger signaling specifically includes indication information for instructing the UE not to feed back the first PMI but to feed back the second PMI, and indication information for determining the first PMI; and the UE feeds back the CSI according to the trigger signaling specifically as follows: the UE determines the first PMI according to the indication information for determining the first PMI, determines the second PMI according to the first PMI, and feeds the second PMI back to the base station.

Or the trigger signaling specifically includes indication information for instructing the UE not to feed back the second PMI but to feed back the first PMI, and indication information for determining the second PMI; and the UE feeds back the CSI according to the trigger signaling specifically as follows: the UE determines the second PMI according to the indication information for determining the second PMI, determines the first PMI according to the second PMI, and feeds the first PMI back to the base station.

Optionally when the trigger signaling does not include the indication information for instructing the UE to feed back the second PMI, the UE feeds back the CSI according to the trigger signaling as follows: the UE determines the first PMI according to a preset second PMI, or according to indication information for determining the second PMI, notified semi-statically by the base station to the UE via higher-layer signaling, or according to a second PMI reported most recently, and feeds the first PMI back to the base station.

Or when the trigger signaling does not include the indication information for instructing the UE to feed back the first PMI, the UE feeds back the CSI according to the trigger signaling as follows: the UE determines the second PMI according to a preset first PMI, or according to indication information for determining the first PMI, notified semi-statically by the base station to the UE via higher-layer signaling, or according to a first PMI reported most recently, and feeds the second PMI back to the base station.

A detailed description thereof is given below.

At the network side, when transmitting trigger signaling to trigger feedback of CSI, the base station may encode indication fields of the first PMI and the second PMI separately or jointly.

The indication fields of the first PMI and the second PMI can be encoded separately as described below.

This scheme provides high flexibility in triggering at the cost of a slightly increased overheads of the trigger signaling. The scheme is described below taking the first PMI as an example, but is also be applicable to the second PMI, so a repeated description thereof is omitted here.

There may be the following three triggered states with respect to the first PMI.

In a first state, the UE is triggered to feed back the first PMI.

In a second state, the UE is not triggered to feed back the first PMI.

In a third state, the system notifies the UE of the first PMI, and the UE calculates the second PMI by using the first PMI, where signaling configured to notify of the first PMI needs to occupy a plurality of bits.

Here the first state and the second state can be encoded in one bit. The third state may be encoded separately from or jointly with the first state and/the second state.

First Example

As depicted in Table 1 below, if the third state is not supported by the system, then the UE may be notified of the first state and the second state in one bit.

TABLE 1

| Value of a one-bit trigger indicator of the first PMI | Behavior of the UE (assumption) |
|---|---|
| 1-bit first PMI trigger = 0 | Report the first PMI |
| 1-bit first PMI trigger = 1 | Not report the first PMI |

As depicted in Table 1 above, the network side can instruct the UE in one bit to or not to report the first PMI. For example, when the bit is 0, it represents that the UE is instructed to report the first PMI, and when the bit is 1, it represents that the UE is instructed not to report the first PMI.

Second Example

When the third state is encoded separately from the first state and the second state, the dynamic signaling includes two fields, and one of the two fields triggers the first PMI to or not to be reported (in one bit), that is, the first state and the second state are indicated as depicted in Table 2 below; and the other of the two fields is used by the system to notify the UE of the first PMI in $\lceil \log_2 (M) \rceil$ bits, where M represents the size of the codebook of the first PMI, and $\lceil \ \rceil$ represents a ceiling function (e.g., when M=7, $\lceil \log_2 (M) \rceil=3$), that is, the third state is indicated as depicted in Table 3 below.

TABLE 2

| Value of a one-bit trigger indicator of the first PMI | Behavior of the UE (assumption) |
|---|---|
| 1-bit first PMI trigger = 0 | Report the first PMI |
| 1-bit first PMI trigger = 1 | Not report the first PMI |

As depicted in Table 2 above, the network side can instruct the UE to or not to report the first PMI in one bit. For example, when the bit is 0, it represents that the UE is instructed to report the first PMI, and when the bit is 1, it represents that the UE is instructed not to report the first PMI.

TABLE 3

| Value of the indication field of the first PMI | Behavior of the UE |
| --- | --- |
| Value 0 | Use a first pre-coding matrix in the first codebook as a first pre-coding matrix corresponding to the first PMI, and report the second PMI |
| Value 1 | Use a second pre-coding matrix in the first codebook as the first pre-coding matrix corresponding to the first PMI, and report the second PMI |
| ... | ... |
| Value M − 1 | Use an M-th pre-coding matrix in the first codebook as the first pre-coding matrix corresponding to the first PMI, and report the second PMI |
| ... | Reserved |
| $2^{\lceil log2(M) \rceil} - 1$ | Reserved |

As depicted in Table 3 above, the network side may notify the UE of the first PMI by using an indication field of the first PMI. For example, when the value of the indication field is 0, it represents that the UE is instructed to use the first pre-coding matrix in the first codebook as the first PMI; when the value of the indication field is 1, it represents that the UE is instructed to use the second pre-coding matrix in the first codebook as the first PMI, and so on until when the value of the indication field is M−1, which represents that the UE is instructed to use the M-th pre-coding matrix in the first codebook as the first PMI, where M represents the number of codewords in the first codebook. The UE calculates and feeds back the second PMI by using to the first PMI notified of by the network side, where both the first PMI and the second PMI correspond to an overall channel corresponding to a pre-coding matrix, for example, as represented in Equation 1.

Table 3A depicts another possible scheduling mode, which includes a state where the UE is instructed to calculate and to feed back the second PMI, e.g., the corresponding state M in Table 3A. If the network at the moment neither schedules the UE to feed back the first PMI (see Table 1), nor notifies the UE of the assumed first PMI via dynamical signaling, and the UE needs to calculate the second PMI by using the first PMI, the UE may assume the first PMI to be the first PMI notified in higher-layer semi-static signaling, or to be the first PMI fed back most recently, or a preset fixed PMI. If the network at the moment also schedules the UE to feed back the first PMI (see Table 1), the UE may calculate the second PMI by using the first PMI which is fed back, and feed back the second PMI. Furthermore there may also be a state (a state M+1) in which the UE is instructed not to feed back the second PMI.

TABLE 3A

| Value of a trigger indicator of the second PMI | Behavior of UE |
| --- | --- |
| Value 0 | Use the first pre-coding matrix in the first codebook as the pre-coding matrix corresponding to the first PMI, and report the second PMI |

TABLE 3A-continued

| Value of a trigger indicator of the second PMI | Behavior of UE |
| --- | --- |
| Value 1 | Use the second pre-coding matrix in the first codebook as the pre-coding matrix corresponding to the first PMI, and report the second PMI |
| ... | ... |
| Value M − 1 | Use the M-th pre-coding matrix in the first codebook as the pre-coding matrix corresponding to the first PMI, and report the second PMI |
| Value M | Report the second PMI |
| Value M + 1 | Not report the second PMI |
| ... | Reserved |

Third Example

The third state can alternatively be encoded together with the first state and the second state as depicted in Table 4 below.

TABLE 4

| Value of a indication field or an indicator field | Behavior of UE |
| --- | --- |
| 0 | Use the first pre-coding matrix in the first codebook as the matrix corresponding to the first PMI, and report the second PMI |
| 1 | Use the second pre-coding matrix in the first codebook as the matrix corresponding to the first PMI, and report the second PMI |
| ... | ... |
| M − 1 | Use the M-th pre-coding matrix in the first codebook as the matrix corresponding to the first PMI, and report the second PMI |
| M | The UE reports the first PMI and the second PME |
| M + 1 | The UE reports neither the first PMI nor the second PMI |
| ... | Reserved |

As depicted in Table 4 above, the network side can notify the UE of the first PMI by using the indication field of the first PMI. For example, when the value of the indication field is 0, it represents that the UE is notified that the first pre-coding matrix in the first codebook is to be used as the first PMI; when the value of the indication field is 1, it represents that the UE is notified that the second pre-coding matrix in the first codebook is to be used as the first PMI, and so on until when the value of the indication field is M−1, which represents that the UE is notified that the M-th pre-coding matrix in the first codebook is to be used as the first PMI, where M represents the number of codewords in the first codebook. When the value of the indication filed is M, it represents that the UE is triggered to report the first PMI and the second PMI. When the value of the indication field is M+1, it represents that the UE is not triggered to report the first PMI nor the second PMI, and the UE needs to report neither the first PMI nor the second PMI.

If the UE is triggered to feed back the second PMI but not the first PMI, and the system does not notify the UE of the first PMI, since the UE needs to know the first PMI for calculating the second PMI, the UE may calculate the second PMI by using a preset fixed first PMI, or a first PMI notified semi-statically by the system to the UE via higher-layer signaling, or a first PMI reported most recently.

The indication fields of the first PMI and the second PMI can be encoded jointly as described below.

The UE needs to support at least the following states.

In a first state, the UE feeds back the first PMI and the second PMI.

In a second state, the UE feeds back neither the first PMI nor the second PMI.

In a third state, the UE feeds back the second PMI, but not the first PMI, where the UE feeds back the second PMI using a first PMI notified of by the eNB.

If the third state is encoded separately from the first state and the second state, then dynamic signaling may include two indication fields, where one bit in one of the fields triggers the first PMI and the second PMI to be fed back as depicted in Table 5 below; and one bit in the other field is used by the system to notify the UE of an assumed first PMI, that is, to notify the UE of the first PMI, as depicted in Table 6 below.

TABLE 5

| One-bit indication field of the first PMI and the second PMI | Behavior of the UE (assumption) |
|---|---|
| 1-bit = 0 | Report the first PMI and the second PMI |
| 1-bit = 1 | Report neither the first PMI nor the second PMI |

As depicted in Table 5 above, when the value of the one-bit indication field of the first PMI and the second PMI is 0, it represents that the first UE is triggered to report the first PMI and the second PMI; and when the value of the one-bit indication field of the first PMI and the second PMI is 1, it represents that the first UE is not triggered to report the first PMI and the second PMI, that is, the UE reports neither the first PMI nor the second PMI, where the first state and the second state are triggered as depicted in Table 5.

TABLE 6

| Indication field of the second PMI | Behavior of the UE |
|---|---|
| Value 0 | Use the first pre-coding matrix in the first codebook as the first PMI, and report the second PMI |
| Value 1 | Use the second pre-coding matrix in the first codebook as the first PMI, and report the second PMI |
| ... | ... |
| Value M − 1 | Use the M-th pre-coding matrix in the first codebook as the first PMI, and report the second PMI |
| ... | Reserved |
| $2^{\lceil log2(M) \rceil} - 1$ | Reserved |

As depicted in Table 6 above, when the value of the one-bit indication field of the first PMI is 0, the UE is triggered to use the first pre-coding matrix in the first codebook as the first PMI, and to report the second PMI; when the value of the one-bit indicator field of the first PMI is 1, the UE is triggered to use the second pre-coding matrix in the first codebook as the first PMI, and to report the second PMI; and so on until when the value of the one-bit indicator field of the first PMI is M−1, where the UE is triggered to use the M-th pre-coding matrix in the first codebook as the first PMI, and to report the second PMI.

That is, the third state is triggered as depicted in Table 6.

If the third state is encoded together with the first state and the second state, then dynamical signaling may include a plurality of bits to trigger the UE, for example as shown in Table 7.

TABLE 7

| Value | Behavior of the UE |
|---|---|
| 0 | Not report the first PMI, but report the second PMI using the first pre-coding matrix in the first codebook as the first PMI |
| 1 | Not report the first PMI, but report the second PMI using the second pre-coding matrix in the first codebook as the first PMI |
| ... | ... |
| M − 1 | Not report the first PMI, but report the second PMI using the M-th pre-coding matrix in the first codebook as the first PMI |
| M | The UE reports the first PMI and the second PMI |
| M + 1 | The UE reports neither the first PMI nor the second PMI |
| ... | Reserved |
| $2^{\lceil log2(M) \rceil} - 1$ | Reserved |

As depicted in Table 7 above, when the value of the indication field (or the indication field) is 0, the UE is triggered to use the first pre-coding matrix in the first codebook as the first PMI; when the value of the indication field (or the indication field) is 1, the UE is triggered to use the second pre-coding matrix in the first codebook as the first PMI; and so on until when the value of the indication field (or the indication field) is M−1, where the UE is triggered to use the M-th pre-coding matrix in the first codebook as the first PMI and to report the second PMI. When the value of the indication field (or the indication field) is M, the UE is triggered to report the first PMI and the second PMI, and when the value of the indication field (or the indication field) is M+1, the UE is not triggered to report the first PMI and the second PMI, that is, the UE reports neither the first PMI nor the second PMI.

It shall be noted that the first PMI and the second PMI above can be interchanged.

Figure 3:
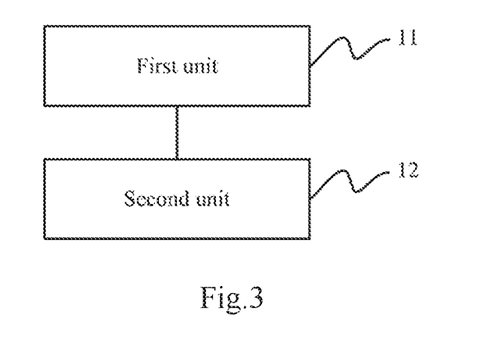
FIG. 3 is a schematic structural diagram of a device for controlling feedback of channel state information according to an embodiment of the disclosure.

In correspondence to the methods above, referring to FIG. 3, a device for controlling feedback of CSI at the network side, e.g., a base station, according to an embodiment of the disclosure includes: a first unit 11 configured to determine that a UE needs to be controlled to feed back CSI at least including a first PMI and a second PMI, both of which correspond to the same pre-coding matrix; and a second unit 12 configured to transmit trigger signaling to the UE to trigger feedback of the CSI, where the trigger signaling includes indication information for instructing the UE whether to feed back the first PMI and/or the second PMI.

Optionally the trigger signaling includes indication information for instructing the UE to feed back both the first PMI and the second PMI; or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI. Or, the trigger signaling includes indication information for instructing the UE not to feed back the second PMI but to feed back the first PMI, and indication information for determining the second PMI.

Optionally when the trigger signaling does not include indication information for instructing the UE to feed back the second PMI, the second unit is further configured to notify semi-statically the UE of indication information for determining the second PMI, via higher-layer signaling. Or, when the trigger signaling does not include indication information for instructing the UE to feed back the first PMI, the second unit is further configured to notify semi-statically the UE of indication information for determining the first PMI, via higher-layer signaling.

Optionally when the trigger signaling does not include indication information for instructing the UE to feed back the second PMI, the UE determines the second PMI using a second PMI fed back most recently. Or, when the trigger signaling does not include indication information for instructing the UE to feed back the first PMI, the UE determines the first PMI using a first PMI fed back most recently.

Optionally when the trigger signaling does not include indication information for instructing the UE to feed back the second PMI, the trigger signaling further includes indication information for instructing the UE to determine the second PMI using indication information for determining the second PMI, notified semi-statically via higher-layer signaling, or using a second PMI fed back most recently; or when the trigger signaling does not include indication information for instructing the UE to feed back the first PMI, the trigger signaling further includes indication information for instructing the UE to determine the first PMI using a first PMI notified semi-statically via higher-layer signaling, or using a first PMI fed back most recently.

Figure 4:
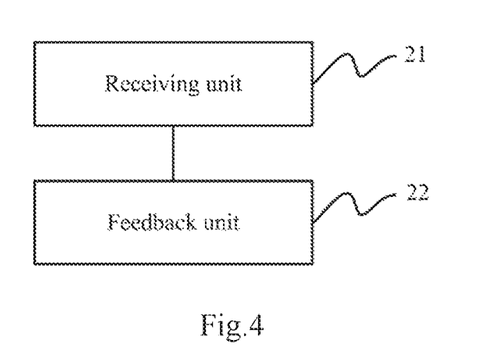
FIG. 4 is a schematic flow chart of a device for feeding back channel state information according to an embodiment of the disclosure.

Correspondingly, referring to FIG. 4, a device for feeding back CSI at the UE side according to an embodiment of the disclosure includes: a receiving unit 21 configured to receive trigger signaling transmitted by a base station to trigger feedback of the CSI, where the trigger signaling includes indication information for instructing the UE whether to feed back a first PMI and/or a second PMI; and a feedback unit 22 configured to feed back the CSI according to the trigger signaling.

Optionally the trigger signaling includes indication information for instructing the UE to feed back both the first PMI and the second PMI; or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI; and the feedback unit is configured to: determine the first PMI according to the indication information for determining the first PMI; determine the second PMI according to the first PMI, and feed the second PMI back to the base station.

Or the trigger signaling includes indication information for instructing the UE not to feed back the second PMI but to feed back the first PMI, and indication information for determining the second PMI; and the feedback unit is configured to: determine the second PMI according to the indication information of the second PMI; determine the first PMI according to the second PMI; and feed the first PMI back to the eNB.

Optionally when the trigger signaling does not include indication information for instructing the UE to feed back the second PMI, the feedback unit is configured to: determine the first PMI according to a preset second PMI, or according to indication information for determining the second PMI, notified semi-statically by the base station to the UE via higher-layer signaling, or according to a second PMI reported most recently; and feed the first PMI back to the base station. Or when the trigger signaling does not include indication information for instructing the UE to feed back the first PMI, the feedback unit is configured to: determine the second PMI according to a preset first PMI, or according to indication information for determining the first PMI, notified semi-statically by the base station to the UE via higher-layer signaling, or according to a first PMI reported most recently; and feed the second PMI back to the base station.

Figure 5:
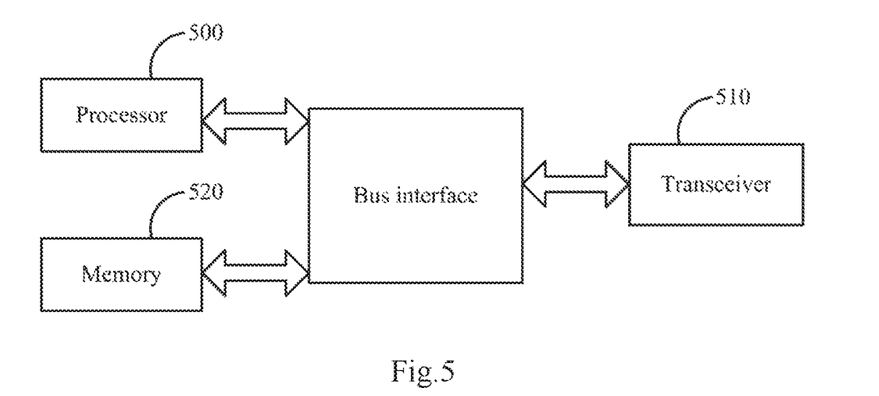
FIG. 5 is a schematic structural diagram of another device for controlling feedback of channel state information according to an embodiment of the disclosure.

Referring to FIG. 5, another device for controlling feedback of CSI at the network side includes a processor 500 configured to read a program in a memory 520 so as to: determine that a UE needs to be controlled to feed back CSI at least including a first PMI and a second PMI, both of which correspond to the same pre-coding matrix; and control a transceiver 510 to transmit trigger signaling to the UE to trigger feedback of the CSI, where the trigger signaling includes indication information for instructing the UE whether to feed back the first PMI and/or the second PMI.

Optionally the trigger signaling includes indication information for instructing the UE to feed back both the first PMI and the second PMI. Or the trigger signaling includes indication information for instructing the UE not to feed the first PMI and the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI and indication information for instructing the UE to feed back the second PMI, in the trigger signaling, is encoded in different bits.

Optionally the trigger signaling includes indication information for instructing the UE not to feed back the first PMI but to feed back the second PMI, and indication information for determining the first PMI; or the trigger signaling includes indication information for instructing the UE not to feed back the second PMI but to feed back the first PMI, and indication information for determining the second PMI.

Optionally when the trigger signaling does not include indication information for instructing the UE to feed back the second PMI, the processor 500 is configured to: control the transceiver 510 to notify semi-statically the UE of indication information for determining the second PMI, via higher-layer signaling. Or when the trigger signaling does not include indication information for instructing the UE to feed back the first PMI, then the processor 500 is configured to: control the transceiver 510 to notify semi-statically the UE of indication information for determining the first PMI, via higher-layer signaling.

Optionally when the trigger signaling does not include indication information for instructing the UE to feed back the second PMI, the UE determines the second PMI using a second PMI fed back most recently. Or when the trigger signaling does not include indication information for instructing the UE to feed back the first PMI, the UE determines the first PMI using a first PMI fed back most recently.

Optionally when the trigger signaling does not include indication information for instructing the UE to feed back the second PMI, the trigger signaling further includes indication information for instructing the UE to determine the second PMI using indication information for determining the second PMI, notified semi-statically via higher-layer signaling, or using a second PMI fed back most recently. Or when the trigger signaling does not include indication information for instructing the UE to feed back the first PMI, the trigger signaling further includes indication information for instructing the UE to determine the first PMI using a first PMI notified semi-statically via higher-layer signaling, or using a first PMI fed back most recently.

The transceiver 510 is configured to be controlled by the processor 500 to receive and transmit data.

Here in FIG. 5, the bus architecture can include any number of interconnecting buses and bridges to specifically link together various circuits including one or more processors represented by the processor 500, and one or more memories represented by the memory 520. The bus architecture can further link together various other circuits, e.g., prophetical devices, manostats, power management circuits, etc., all of which are well known in the art, so a further description thereof is omitted in this context. The bus interface serves as an interface. The transceiver 510 can comprise a number of elements, including a transmitter and a receiver, which are units for communication with various other devices over a transmission medium. The processor 500 is responsible for managing the bus architecture and performing normal processes, and the memory 520 can store data for use by the processor 500 when performing the operations.

Figure 6:
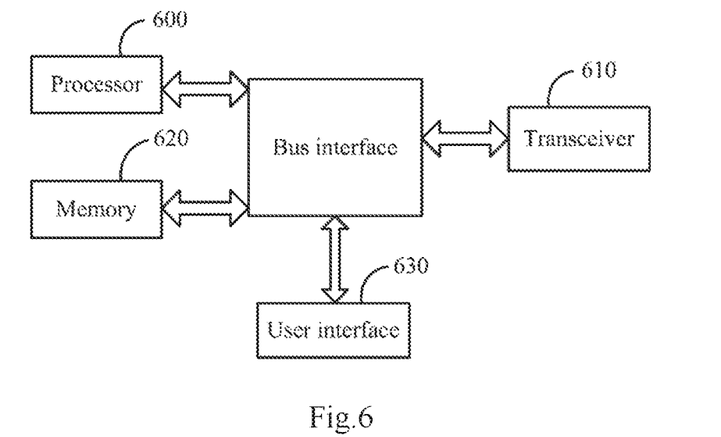
FIG. 6 is a schematic flow chart of another device for feeding back channel state information according to an embodiment of the disclosure.

Correspondingly, referring to FIG. 6, another device for feeding back CSI at the UE side according to an embodiment of the disclosure includes a processor 600 configured to read a program in a memory 620 so as to: control the transceiver 610 to receive trigger signaling transmitted by a base station to trigger feedback of the CSI, where the trigger signaling includes indication information for instructing the UE whether to feed back a first PMI and/or a second PMI; and feed back the CSI according to the trigger signaling.

Optionally the trigger signaling includes indication information for instructing the UE to feed back both the first PMI and the second PMI; or the trigger signaling includes indication information for instructing the UE not to feed back the first PMI or the second PMI.

Optionally indication information for instructing the UE to feed back the first PMI and indication information for instructing the UE to feed back the second PMI, in the trigger signaling, is encoded in the same bit. Or indication information for instructing the UE to feed back the first PMI, and indication information for instructing the UE to feed back the second PMI, in the trigger signaling is encoded in different bits.

Optionally the trigger signaling includes indication information for instructing the UE not to feed back the first PMI but to feed back the second PMI, and indication information for determining the first PMI; and the processor 600 is configured to: determine the first PMI according to the indication information for determining the first PMI; determine the second PMI according to the first PMI; and control the transceiver 610 to feed the second PMI back to the base station.

Or the trigger signaling includes indication information for instructing the UE not to feed back the second PMI but to feed back the first PMI, and indication information for determining the second PMI; and the processor 600 is configured to: determine the second PMI according to the indication information for determining the second PMI; determine the first PMI according to the second PMI; and control the transceiver 610 to feed the first PMI back to the base station.

Optionally when the trigger signaling does not include indication information for instructing the UE to feed back the second PMI, the processor 600 is configured to: determine the first PMI according to a preset second PMI, or according to indication information for determining the second PMI, notified semi-statically by the base station to the UE via higher-layer signaling, or according to a second PMI reported most recently; and control the transceiver 610 to feed the first PMI back to the base station, Or when the trigger signaling does not include indication information for instructing the UE to feed back the first PMI, the processor 600 is configured to: determine the second PMI according to a preset first PMI, or according to indication information for determining the first PMI, notified semi-statically by the base station to the UE via higher-layer signaling, or according to a first PMI reported most recently; and control the transceiver 610 to feed the second PMI back to the base station.

The transceiver 610 is configured to be controlled by the processor 600 to receive and transmit data.

Here in FIG. 6, the bus architecture can include any number of interconnected buses and bridges to specifically link together various circuits including one or more processors represented by the processor 600, and one or more memories represented by the memory 620. The bus architecture can further link together various other circuits, e.g., prophetical devices, manostats, power management circuits, etc., all of which are well known in the art, so a further description thereof is omitted in this context. The bus interface serves as an interface. The transceiver 610 can comprise a number of elements, including a transmitter and a receiver, which are units for communication with various other devices over a transmission medium. For different user apparatuses, the user interface 630 may also be an interface via which external or internal devices can be connected as appropriate, where the connected apparatuses include but are not be limited to a keypad, a display, a speaker, a microphone, a joystick, etc.

The processor 600 is responsible for managing the bus architecture and performing normal processes, and the memory 620 can store data for use by the processor 600 when performing the operations.

In summary, the embodiments of the disclosure provide a scheme for aperiodic feedback of CSI, and a scheme for controlling (or triggering) the aperiodic feedback of the CSI in a large-scale antenna system, where feedback of a first PMI, and feedback of a second PMI may be triggered separately. The eNB can provide an assumption of a part of the CSI (e.g., the first PMI) for feedback of the other part of the CSI (e.g., the second PMI) thus addressing the problem of the absence of supports for feedback of CSI in an existing large-scale antenna system, lowering the complexity of feeding back the CSI by the UE, and improving the flexibility of the eNB in controlling the feedback of the CSI.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer usable storage mediums (including but not limited to a disk memory, an optical memory, etc.) in which computer usable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for controlling feedback of Channel State Information (CSI), the method comprising:
determining, by a base station, that a User Equipment (UE) needs to be controlled to feed back CSI, wherein the CSI at least comprises a first Pre-coding Matrix Indicator (PMI) and a second PMI, the first PMI and the second PMI correspond to the same pre-coding matrix, wherein the UE is configured with PMI reporting, wherein the same pre-coding matrix corresponds to multiple antennas having two-dimension antenna structure and configured in the base station; wherein the same pre-coding matrix comprises a first codebook corresponding to a vertical dimension of the multiple antennas, and a second codebook corresponding to a horizontal dimension of the multiple antennas; wherein the first PMI is used for indicating a precoder in the first codebook and the second PMI is used for indicating a precoder in the second codebook; and transmitting, by the base station, trigger signaling to the UE to trigger feedback of the CSI, wherein the trigger signaling comprises indication information for instructing the UE not to feed back the first PMI, but to feed back the second PMI, or indication information for instructing the UE not to feed back the second PMI but to feed back the first PMI.

2. The method according to claim 1, wherein the trigger signaling comprises indication information for instructing the UE to feed back both the first PMI and the second PMI; or
the trigger signaling comprises indication information for instructing the UE not to feed back the first PMI or the second PMI.

3. The method according to claim 2, wherein indication information for instructing the UE to feed back the first PMI and indication information for instructing the UE to feed back the second PMI, in the trigger signaling, is encoded in the same bit; or
indication information for instructing the UE to feed back the first PMI and indication information for instructing the UE to feed back the second PMI, in the trigger signaling, is encoded in different bits.

4. The method according to claim 1, wherein in a case that the trigger signaling comprises indication information for instructing the UE not to feed back the first PMI but to feed back the second PMI, the trigger signaling further comprises indication information for determining the first PMI;
in a case that the trigger signaling comprises indication information for instructing the UE not to feed back the second PMI but to feed back the first PMI, the trigger signaling further comprises indication information for determining the second PMI.

5. The method according to claim 1, wherein when the trigger signaling does not comprise indication information for instructing the UE to feed back the second PMI, the method further comprises: notifying semi-statically, by the base station, the UE of indication information for determining the second PMI, via higher-layer signaling; or
when the trigger signaling does not comprise indication information for instructing the UE to feed back the first PMI, the method further comprises: notifying semi-statically, by the base station, the UE of indication information for determining the first PMI, via higher-layer signaling.

6. The method according to claim 1, wherein when the trigger signaling does not comprise indication information for instructing the UE to feed back the second PMI, the base station controls the UE to determine the second PMI using a second PMI fed back most recently; or
when the trigger signaling does not comprise indication information for instructing the UE to feed back the first PMI, then the base station controls the UE to determine the first PMI using a first PMI fed back most recently.

7. The method according to claim 1, wherein when the trigger signaling does not comprise indication information for instructing the UE to feed back the second PMI, the trigger signaling further comprises indication information for instructing the UE to determine the second PMI using indication information for determining the second PMI, notified semi-statically via higher-layer signaling, or using a second PMI fed back most recently; or
when the trigger signaling does not comprise indication information for instructing the UE to feed back the first PMI, the trigger signaling further comprises indication information for instructing the UE to determine the first PMI using indication information for determining the first PMI, notified semi-statically via higher-layer signaling, or using a first PMI fed back most recently.

8. A method for feeding back Channel State Information (CSI), the method comprising:
receiving, by a User Equipment (UE), trigger signaling transmitted by a base station to trigger feedback of the CSI, wherein the trigger signaling comprises indication information for instructing the UE not to feed back a first Pre-coding Matrix Indicator (PMI), but to feed back a second PMI, or indication information for instructing the UE not to feed back the second PMI but to feed back the first PMI; wherein the first PMI and the second PMI correspond to the same pre-coding matrix, wherein the UE is configured with PMI reporting, wherein the same pre-coding matrix corresponds to multiple antennas having two-dimension antenna structure and configured in the base station; wherein the same pre-coding matrix comprises a first codebook corresponding to a vertical dimension of the multiple antennas, and a second codebook corresponding to a horizontal dimension of the multiple antennas; wherein the first PMI is used for indicating a precoder in the first codebook and the second PMI is used for indicating a precoder in the second codebook; and
feeding back, by the UE, the CSI according to the trigger signaling.

9. The method according to claim 8, wherein the trigger signaling comprises indication information for instructing the UE to feed back both the first PMI and the second PMI; or
the trigger signaling comprises indication information for instructing the UE not to feed back the first PMI or the second PMI.

10. The method according to claim 9, wherein indication information for instructing the UE to feed back the first PMI and indication information for instructing the UE to feed back the second PMI, in the trigger signaling, is encoded in the same bit; or
indication information for instructing the UE to feed back the first PMI and indication information for instructing the UE to feed back the second PMI, in the trigger signaling, is encoded in different bits.

11. The method according to claim 8, wherein in a case that the trigger signaling comprises indication information for instructing the UE not to feed back the first PMI but to feed back the second PMI, the trigger signaling further comprises indication information for determining the first PMI; and feeding back, by the UE, the CSI according to the trigger signaling comprises: determining, by the UE, the first PMI according to the indication information for determining the first PMI; determining the second PMI according to the first PMI; and feeding back the second PMI to the base station;
or
in a case that the trigger signaling comprises indication information for instructing the UE not to feed back the second PMI but to feed back the first PMI, the trigger signaling further comprises indication information for determining the second PMI; and feeding back, by the UE, the CSI according to the trigger signaling comprises: determining, by the UE, the second PMI according to the indication information for determining the second PMI; determining the first PMI according to the second PMI; and feeding back the first PMI to the base station.

12. The method according to claim 8, wherein when the trigger signaling does not comprise indication information for instructing the UE to feed back the second PMI, feeding back, by the UE, the CSI according to the trigger signaling comprises: determining, by the UE, the first PMI according to a preset second PMI, or according to indication information for determining the second PMI, notified semi-statically by the base station to the UE via higher-layer signaling, or according to a second PMI reported most recently; and feeding back the first PMI to the base station; or
when the trigger signaling does not comprise indication information for instructing the UE to feed back the first PMI, feeding back, by the UE, the CSI according to the trigger signaling comprises: determining, by the UE, the second PMI according to a preset first PMI, or according to indication information for determining the first PMI, notified semi-statically by the base station to the UE via higher-layer signaling, or according to a first PMI reported most recently; and feeding back the second PMI to the base station.

13. A device for feeding back Channel State Information (CSI), the device comprising:
a transceiver;
a processor; and
a memory storing at least one instruction, wherein the processor is configured to execute the at least one instruction to:
control the transceiver to receive trigger signaling transmitted by a base station to trigger feedback of the CSI, wherein the trigger signaling comprises indication information for instructing a UE not to feed back a first Pre-coding Matrix Indicator (PMI), but to feed back a second PMI, or indication information for instructing the UE not to feed back the second PMI, but to feed back the first PMI; wherein the first PMI and the second PMI correspond to the same pre-coding matrix, wherein the UE is configured with PMI reporting, wherein the same pre-coding matrix corresponds to multiple antennas having two-dimension antenna structure and configured in the base station; wherein the same pre-coding matrix comprises a first codebook corresponding to a vertical dimension of the multiple antennas, and a second codebook corresponding to a horizontal dimension of the multiple antennas; wherein the first PMI is used for indicating a precoder in the first codebook and the second PMI is used for indicating a precoder in the second codebook; and
control the transceiver to feed back the CSI according to the trigger signaling.

14. The device according to claim 13, wherein the trigger signaling comprises indication information for instructing the UE to feed back both the first PMI and the second PMI; or
the trigger signaling comprises indication information for instructing the UE not to feed the first PMI and the second PMI.

15. The device according to claim 13, wherein in a case that the trigger signaling comprises indication information for instructing the UE not to feed back the first PMI but to feed back the second PMI, the trigger signaling further comprises indication information for determining the first PMI; and the processor is configured to execute the at least one instruction to: determine the first PMI according to the indication information of the first PMI; determine the second PMI according to the first PMI; and control the transceiver to feed back the second PMI to the base station; or
in a case that the trigger signaling comprises indication information for instructing the UE not to feed back the second PMI but to feed back the first PMI, the trigger signaling further comprises indication information for determining the second PMI; and the processor is configured to execute the at least one instruction to: determine the second PMI according to the indication information of the second PMI; determine the first PMI according to the second PMI; and control the transceiver to feed back the first PMI to the base station.

16. The device according to claim 13, wherein when the trigger signaling does not comprise indication information for instructing the UE to feed back the second PMI, the processor is configured to execute the at least one instruction to: determine the first PMI according to a preset second PMI, or according to indication information for determining the second PMI, notified semi-statically by the base station to the UE via higher-layer signaling, or according to a second PMI reported most recently; and control the transceiver to feed back the first PMI to the base station; or when the trigger signaling does not comprise indication information for instructing the UE to feed back the first PMI, then the processor is configured to execute the at least one instruction to: determine the second PMI according to a preset first PMI, or according to indication information for determining the first PMI, notified semi-statically by the base station to the UE via higher-layer signaling, or according to a first PMI reported most recently; and control the transceiver to feed back the second PMI to the base station.

* * * * *